(12) United States Patent
Nonaka

(10) Patent No.: US 10,220,479 B2
(45) Date of Patent: Mar. 5, 2019

(54) MACHINING APPARATUS

(71) Applicant: TOYOTA JIDOSHA KABUSHIKI KAISHA, Toyota-shi (JP)

(72) Inventor: Hiroki Nonaka, Nissin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/494,791

(22) Filed: Apr. 24, 2017

(65) Prior Publication Data

US 2017/0304978 A1    Oct. 26, 2017

(30) Foreign Application Priority Data

Apr. 25, 2016  (JP) .................................. 2016-087187
Mar. 31, 2017  (JP) .................................. 2017-069703

(51) Int. Cl.
*B23B 29/034*    (2006.01)
*B23Q 15/02*    (2006.01)
(Continued)

(52) U.S. Cl.
CPC ........ *B23Q 15/02* (2013.01); *B23B 29/03489* (2013.01); *B23B 41/04* (2013.01); *B23B 41/12* (2013.01); *B23C 3/02* (2013.01); *B23Q 5/32* (2013.01); *B24B 33/02* (2013.01); *B23B 2260/102* (2013.01); *B23B 2260/108* (2013.01);
(Continued)

(58) Field of Classification Search
CPC ............. Y10T 408/854; Y10T 408/855; Y10T 409/307616; Y10T 409/309352; Y10T 82/12; Y10T 82/122; Y10T 82/125; B23B 29/03489; B23B 29/03432; B23B 41/12; B23B 2260/108; B23B 2270/38;
(Continued)

(56) References Cited

U.S. PATENT DOCUMENTS 4,686,404 A * 8/1987 Nakazeki ............ F16C 32/0489
                                                             310/90.5
5,027,280 A * 6/1991 Ando ........................ B23Q 1/70
                                                             310/90.5
(Continued)

FOREIGN PATENT DOCUMENTS

CN        101341002 A        1/2009
DE        10229134 A1 *      1/2004    ........... B23B 31/026
(Continued)

*Primary Examiner* — Daniel Howell
(74) *Attorney, Agent, or Firm* — Oblon, McClelland, Maier & Neustadt, L.L.P.

(57) ABSTRACT

Provided is a machining apparatus capable of improving the positioning accuracy of a machining tool as compared to conventional machines. A machining apparatus 1 includes a rotating tool, a machining tool provided on an outer periphery of the rotating tool, and a spindle head adapted to rotatably support the rotating tool. The machining apparatus includes a driving portion configured to move the spindle head in a direction perpendicular to an axis of rotation R of the rotating tool, a position sensor configured to measure a position of the spindle head on a plane perpendicular to the axis of rotation R, and a control unit configured to control the driving portion so as to move the machining tool in a direction perpendicular to the axis of rotation R of the rotating tool on the basis of the position of the spindle head.

9 Claims, 12 Drawing Sheets

(51) Int. Cl.
*B23C 3/02* (2006.01)
*B24B 33/02* (2006.01)
*B23Q 5/32* (2006.01)
*B23B 41/04* (2006.01)
*B23B 41/12* (2006.01)

(52) U.S. Cl.
CPC .... *B23C 2215/242* (2013.01); *B23C 2220/24* (2013.01)

(58) Field of Classification Search
CPC ....... B23B 2270/48; B23Q 15/02; B23C 3/02; B23C 3/16; B23C 2215/242; B23C 2220/24
USPC ........................................................ 310/90.5
See application file for complete search history.

(56) References Cited

U.S. PATENT DOCUMENTS

| | | | | |
|---|---|---|---|---|
| 5,879,113 A | * | 3/1999 | Ueyama | G05B 19/4166 408/124 |
| 7,264,430 B2 | * | 9/2007 | Bischof | B23B 5/36 310/90.5 |
| 7,812,493 B2 | * | 10/2010 | Kubo | B23Q 1/70 310/51 |
| 2006/0219066 A1 | * | 10/2006 | Nicholl | B23B 41/04 82/1.11 |
| 2008/0022818 A1 | * | 1/2008 | Hackh | B23Q 23/00 82/147 |
| 2008/0246358 A1 | * | 10/2008 | Kubo | B23Q 1/70 310/90.5 |
| 2010/0197199 A1 | | 8/2010 | Flores et al. | |
| 2011/0023667 A1 | | 2/2011 | Kume et al. | |

FOREIGN PATENT DOCUMENTS

| | | | | |
|---|---|---|---|---|
| JP | 61152304 A | * | 7/1986 | ............... B23Q 1/26 |
| JP | 08099254 A | * | 4/1996 | |
| JP | 2005-288604 | | 10/2005 | |
| JP | 2010-38911 | | 2/2010 | |
| JP | 2010-533597 | | 10/2010 | |
| WO | WO 2007048637 A1 | * | 5/2007 | ....... B23B 29/03432 |

* cited by examiner

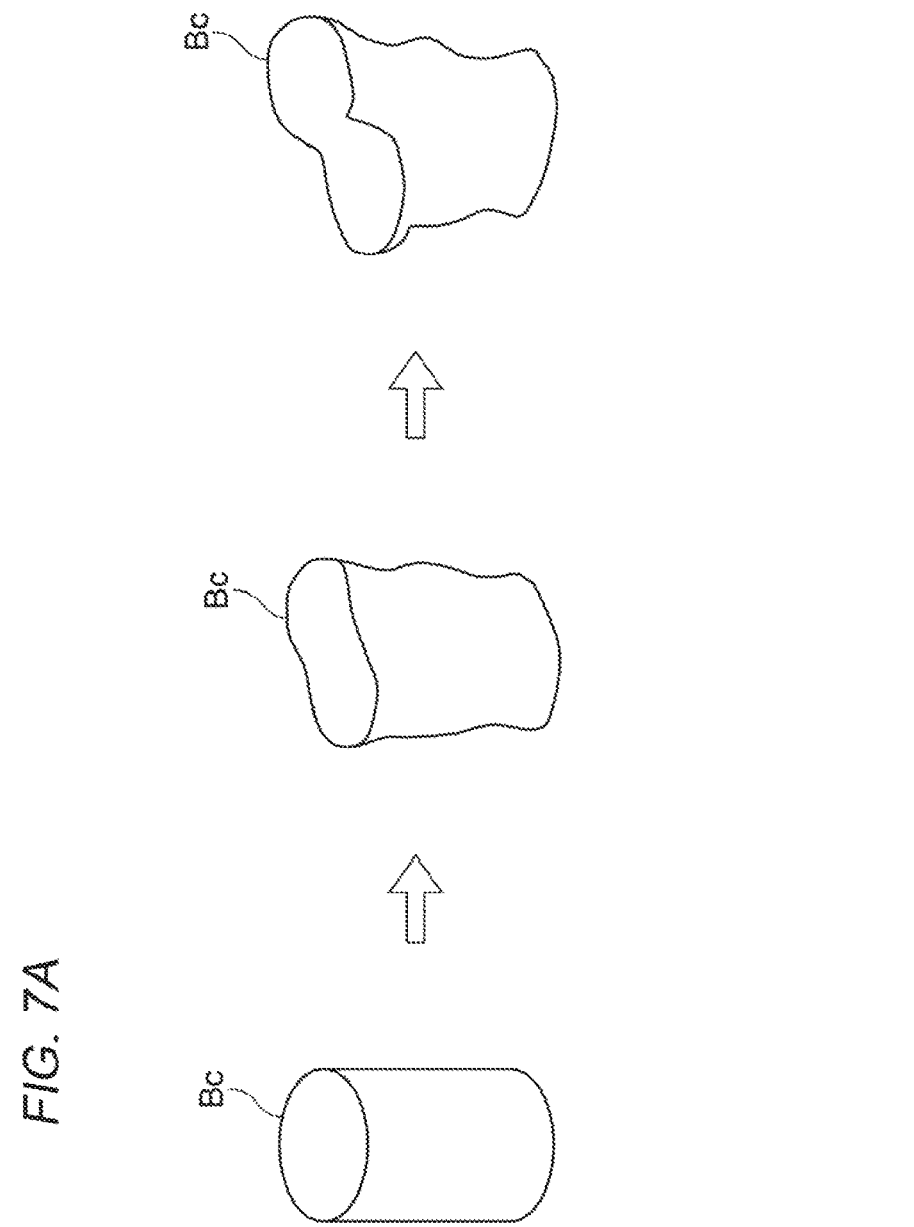

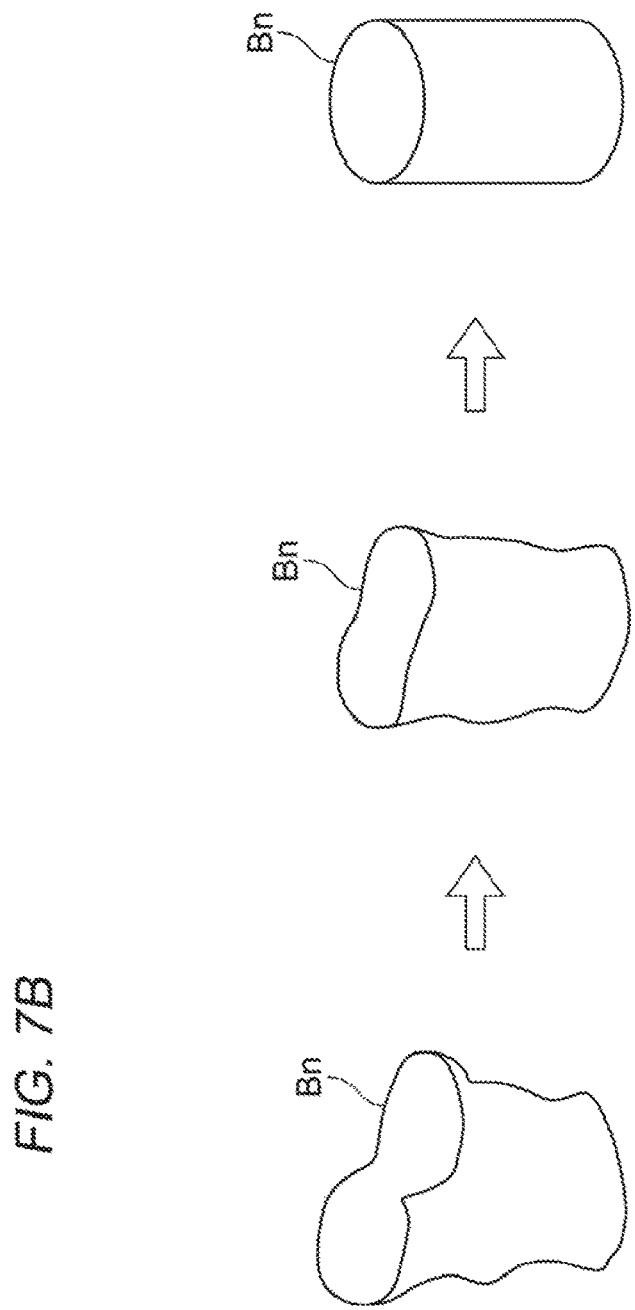

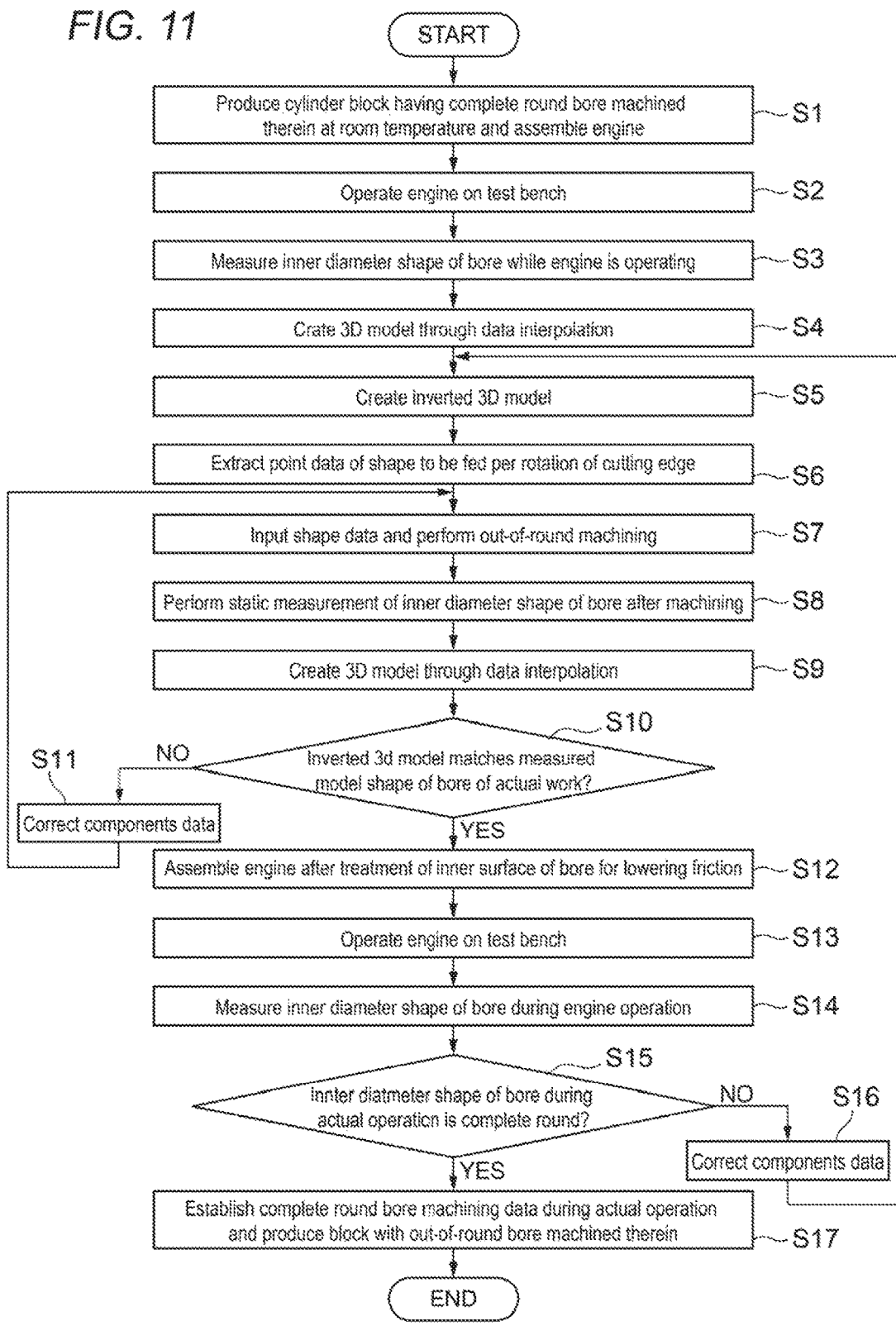

MACHINING APPARATUS

The present application claims priority from Japanese patent application JP 2016-087187 filed on Apr. 25, 2016 and Japanese patent application JP 2017-060703 filed on Mar. 31, 2017, the content of which is hereby incorporated by reference into this application.

TECHNICAL FIELD

The present disclosure relates to a machining apparatus for machining a complete round or out-of-round curved surface on a workpiece.

BACKGROUND ART

Inventions related to honing or boring machines have conventionally been known (see Patent Document 1 below). Patent Document 1 discloses a machine with the following configuration as a machine for producing a non-cylindrical bore surface (see claim 1 and the like of Patent Document 1).

The machine described in Patent Document 1 includes a machine spindle that is reciprocatingly movable and rotationally driven. The machine spindle, to which at least one machining tool can be connected, transmits a movement to the machining tool via a feed means. The feed movement feeds the machining tool radially against a bore surface to be machined, after deflecting the direction. Further, the feed movement of the feed means is superposed by a feed movement of a means for fine feed so that a non-cylindrical bore surface is produced.

In the machine of Patent Document 1, the means for fine feed is disposed in a tool receiving unit associated with the machine spindle, and includes a linear drive that is actuated in parallel to the axis. An actuator of the linear drive actuates a feed rod. The feed rod has the machining tool and a means for deflecting the direction of the feed movement and is disposed in a tool unit that is exchangeably connected to the tool receiving unit.

More specifically, with sliding movements of a wedge-shaped feed surface provided on the machining tool and a wedge-shaped feed surface provided at a tip end of the feed rod, the axial feed movement of the feed rod is converted into a radial feed movement of the machining tool (see claim 15, paragraph 0035, FIG. 5, and the like of Patent Document 1).

RELATED ART DOCUMENTS

Patent Document

Patent Document 1: JP 2010-533597 A

SUMMARY

The machine described in Patent Document 1 above uses a force transmission mechanism that includes the wedge-shaped feed surfaces provided on the feed rod and the machining tool as the means for deflecting an axial feed movement of the linear drive into a radial feed movement. In such a mechanical force transmission mechanism, due to abrasion of components sliding against each other or the like, a problem may arise that the positioning accuracy of the machining tool is lowered.

The present disclosure has been made in view of the foregoing problem, and it is an object of the present disclosure to provide a machining apparatus capable of improving the positioning accuracy of a machining tool as compared to conventional machines.

In order to achieve the aforementioned object, the machining apparatus of the present disclosure includes a rotating tool, a machining tool provided on an outer periphery of the rotating tool, a spindle head adapted to rotatably support the rotating tool, a driving portion configured to move the spindle head in a direction perpendicular to an axis of rotation of the rotating tool, a position sensor configured to measure the position of the spindle head on a plane perpendicular to the axis of rotation, and a control unit configured to control the driving portion so as to move the machining tool in a direction perpendicular to the axis of rotation of the rotating tool on the basis of the position of the spindle head.

More specifically, according to an embodiment of the machining apparatus, there is provided an apparatus for out-of-round machining that includes a machining tool and a spindle head adapted to rotate the machining tool and that is adapted to move the machining tool along an out-of-round trajectory of tool rotation, and that further includes a piezo actuator configured to move the spindle head in a direction perpendicular to the axis of rotation of the machining tool, a position sensor configured to measure the position of the spindle head on a plane perpendicular to the axis of rotation, and a control unit configured to control the piezo actuator so as to move the machining tool along the trajectory of tool rotation on the basis of the position of the spindle head.

The machining apparatus of the present disclosure is an apparatus for machining a complete round or out-of-round surface on a workpiece and can be used, for example, as a boring machine or a honing machine for performing boring or honing on a workpiece such as a cylinder block of an engine. Examples of the machining tool include a cutting tool for boring and a grinding tool for honing.

The spindle head can include a spindle adapted to rotate the rotating tool, a bearing adapted to rotatably support the spindle, a motor adapted to rotate the spindle, and an encoder configured to measure an angle of rotation of the motor. More specifically, the spindle head can include, for example, a spindle adapted to rotate the machining tool, a bearing adapted to rotatably support the spindle, a spindle head case adapted to house and retain the bearing therein, a motor adapted to rotate the spindle, and an encoder configured to measure an angle of rotation of the motor.

The driving portion may include a piezo actuator or a magnetostrictive member. Further, the driving portion may include a plurality of driving portions that are disposed so as to face the spindle head in two or more directions perpendicular to the axis of rotation of the rotating tool. More specifically, piezo actuators or magnetostrictive members that are adapted to move the spindle head in a direction perpendicular to the axis of rotation of the machining tool can be disposed, for example, at positions facing the spindle head case of the spindle head in two directions of the x-axis and y-axis directions that are perpendicular to the axis of rotation and are also perpendicular to each other. It should be noted that the piezo actuators or the magnetostrictive members may also be disposed so as to face the spindle head in three or more directions perpendicular to the axis of rotation.

The piezo actuators or the magnetostrictive members of the driving portions can be disposed so as to face each other with the spindle head case of the spindle head interposed therebetween in each direction perpendicular to the axis of rotation. In that case, the machining apparatus can include a differential circuit configured to drive the actuators or the magnetostrictive members facing each other considering the difference in the driving force between extending and contracting operations of the piezo actuators or the magnetostrictive members, and hysteresis.

Examples of the position sensor configured to measure the position of the spindle head on a plane perpendicular to the axis of rotation of the machining tool include a contact or non-contact displacement sensor. Examples of the non-contact displacement sensor include, but are not particularly limited to, a capacitance sensor, a laser displacement meter, an ultrasonic displacement meter, an eddy-current displacement sensor, and an image sensor. Further, a sensor such as a strain gauge can be embedded in the piezo actuator or the magnetostrictive member so as to measure the position.

The control unit configured to control the driving portions that use, for example, the piezo actuators or the magnetostrictive members can include, for example, a computing unit such as a CPU, a storage unit such as a memory and a hard disk, a program stored in the storage unit, and an input/output unit configured to receive/output signals from/to an external device such as a sensor. The control unit may further include a personal computer that has an input interface such as a keyboard and a display device such as a monitor.

The control unit, for example, can store in advance in the storage unit the relation between the position of the spindle head and the position of the axis of rotation of the machining tool, that is, the rotating took the relation between the position and the angle of rotation of the axis of rotation of the machining tool, that is, the rotating tool, and the position of a machining unit such as a cutting edge, and a complete round or out-of-round trajectory of tool rotation as a target value of the position of the machining unit.

The control unit may control the driving portions on the basis of a target position of the spindle head at the angle of rotation of the machining tool. More specifically, the control unit, for example, computes on the basis of a program stored in the storage unit, the relation between the angle of rotation of the machining tool and the position of the spindle head to move the machining portion of the machining tool along a trajectory of tool rotation stored in the storage unit. In accordance with the angle of rotation of the machining tool input from the encoder, the control unit controls the amounts of extension and contraction of the piezo actuators or the magnetostrictive members and moves the spindle head, as necessary, in a direction perpendicular to the axis of rotation of the machining tool, that is, the rotating tool, so as to satisfy the computed relation between the angle of rotation of the machining tool and the position of the spindle head. It should be noted that a data sheet that shows the angles of rotation of the machining tool and the positions of the spindle head may be stored in the storage unit in advance so as to sequentially output the angles of rotation of the machining tool and the positions of the spindle head stored in the storage unit.

In this manner, in machining a workpiece through rotation of the machining tool, the control unit controls the piezo actuators or the magnetostrictive members used as the driving portions so as to apply an external force to the spindle head, thereby deviating the trajectory of tool rotation from the complete round trajectory to create an out-of-round trajectory of tool rotation and machining an out-of-round bore in the workpiece. That is, the control unit moves the spindle bead by driving the piezo actuators or the magnetostrictive members of the driving portions so as to satisfy art amount of deviation that is the difference between the complete round trajectory of tool rotation obtained when the machining tool is rotated with the spindle head fixed and a targeted out-of-round trajectory of tool rotation.

Further, the control unit can perform feedback control using the difference between a target position and the actual position of the spindle head. More specifically, the control unit can perform the feedback control using the computed difference between the target position of the spindle bead and the actual position of the spindle head that has been input from the position sensor, on the basis of a program stored in the storage unit, for example. In this manner, the control unit can control the piezo actuators so as to move the machining tool along the trajectory of tool rotation on the basis of the position of the spindle head measured by the position sensor.

As understood from the foregoing description, according to the machining apparatus of the present disclosure, the control unit controls the driving portions that use the piezo actuators or the magnetostrictive members so as to move the spindle head, thereby allowing the machining tool to move along a targeted complete round or out-of-round trajectory of tool rotation. Accordingly, a driving force transmission mechanism for radially moving the machining tool, as has been conventionally used, is no longer needed, and the positioning accuracy of the machining tool can be improved as compared to those of the conventional apparatuses.

BRIEF DESCRIPTION OF THE DRAWINGS

FIG. 7A shows conceptual views of bores each machined so as to have a complete round or out-of-round shape;

FIG. 7B shows conceptual views of bores each machined so as to have a complete round or out-of-round shape;

FIG. 11 is a flow chart showing an example of complete round or out-of-round machining using the machining apparatus shown in FIG. 1.

DETAILED DESCRIPTION

With reference to the drawings, an embodiment of the machining apparatus of the present disclosure will be described below.

Figure 1:
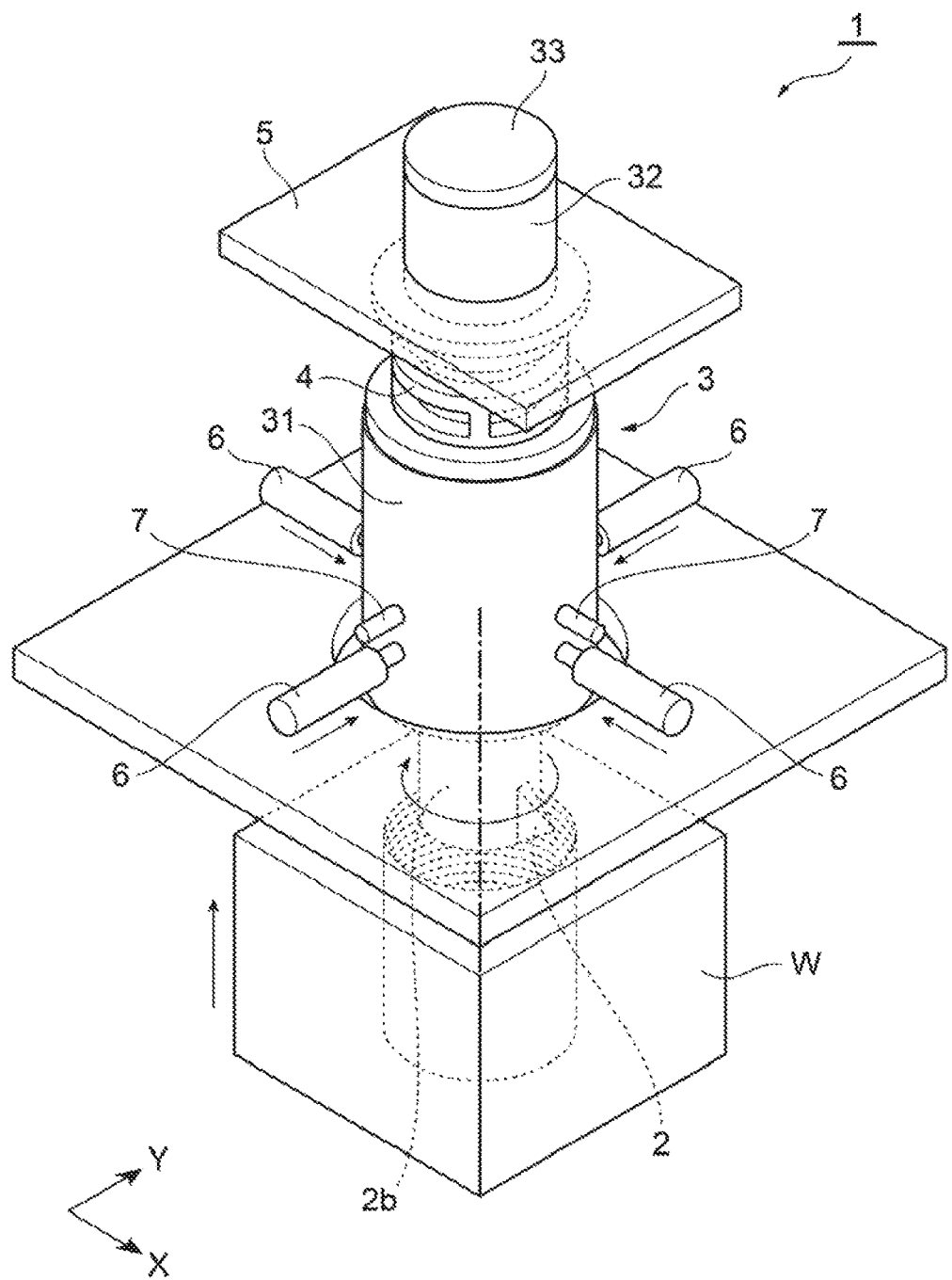
FIG. 1 is a schematic perspective view of a machining apparatus according to an embodiment of the present disclosure.
Figure 2:
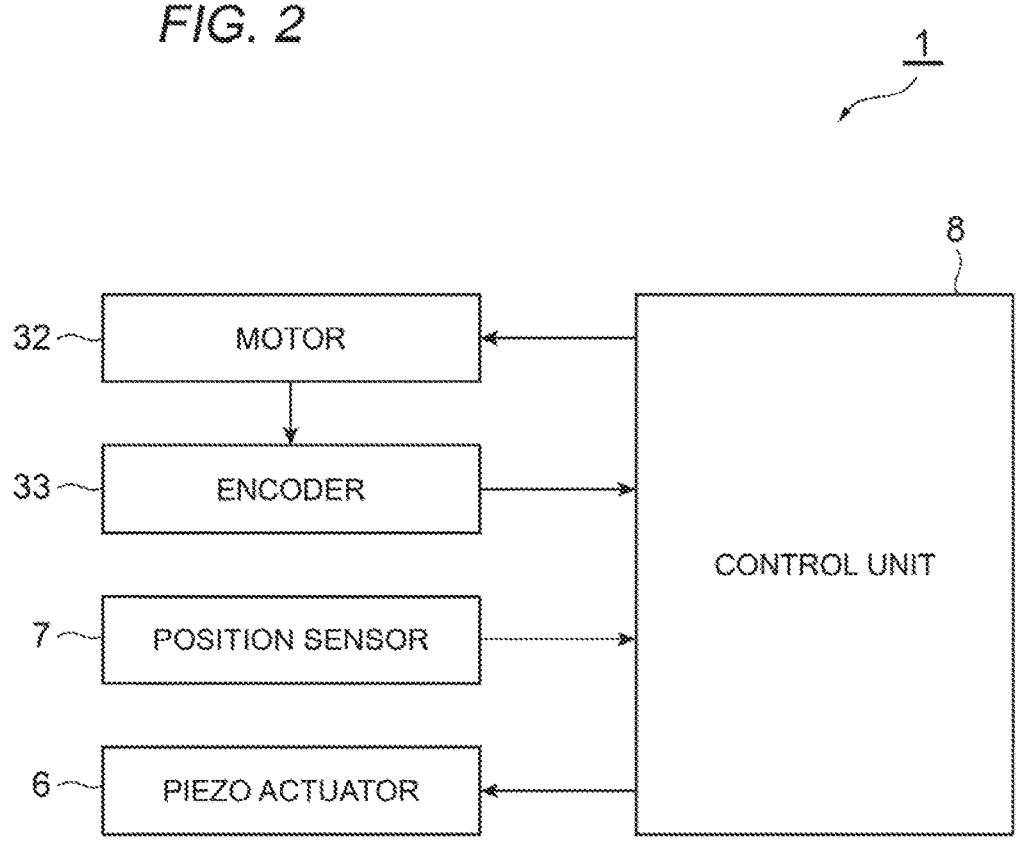
FIG. 2 is a block diagram of the machining apparatus shown in FIG. 1.

FIG. 1 is a schematic perspective view of a machining apparatus 1 according to an embodiment of the present disclosure. FIG. 2 is a block diagram of the machining apparatus 1 shown in FIG. 1.

The machining apparatus 1 of the present embodiment includes a rotating tool 2b, a machining tool 2 provided on the outer periphery of the rotating tool 2b, and a spindle head 3 that rotatably supports the rotating tool 2b, and is adapted to machine a complete round or out-of-round surface on a workpiece W as a target to be machined by moving the machining tool 2 along a complete round or out-of-round trajectory of tool rotation.

Examples of the machining tool 2 include a cutting tool for boring and a grinding tool for honing. That is, the machining apparatus 1 can be used, for example, as a boring machine or a honing machine for boring or honing a bore of a cylinder block as the workpiece W.

The spindle head 3 includes, for example, a spindle head case 31, a motor 32, and an encoder 33 that measures the angle of rotation of the motor 32. The spindle head 3 is supported in a state of hanging from an attaching base 5 by means of a flexible coupling 4 with the spindle head case 31 fixed to the attaching base 5 via the flexible coupling 4. The flexible coupling 4 deforms so as to tolerate the movement of the spindle head 3 in a direction perpendicular to the axial direction of a spindle. The motor 32 is supported by the attaching base 5.

Although not shown, the spindle head 3 further includes a bearing housed in and retained by the spindle head case 31 and a spindle rotatably supported by the bearing inside the spindle head case 31. The spindle is connected at one end to a drive shaft of the motor 32 and at the other end to the machining tool 2, and is rotated by the rotation of the drive shaft of the motor 32 so as to rotate the machining tool 2 about an axis of rotation R of the rotating tool 2b.

The machining apparatus 1 further includes a driving portion 6 that has a piezo actuator or a magnetostrictive member, a position sensor 7, and a control unit 8 (see FIG. 2). Examples of the magnetostrictive member can include a monocrystalline magnetostrictive material of terbium, dysprosium, or iron. Magnetostriction, as referred to herein, is a physical phenomenon in which a magnetic material is elastically deformed due to the external influence of the magnetic field, and a magnetostrictive material has characteristics in that it has a fast response, can generate a large force, and is highly durable, which are compatible to those of piezo actuators. It should be noted that a giant magnetostrictive material has, for example, a magnetostriction of about 2000 ppm, which is larger than that of conventional magnetostrictive materials by nearly double digits.

The driving portion 6 is disposed in a direction perpendicular to the spindle of the spindle head 3 and the axis of rotation R of the rotating tool 2b, that is, the machining tool 2, at a position adjacent to and facing the spindle head case 31. More specifically, a total of four driving portions 6 are disposed in two directions of the x-axis and y-axis directions that are perpendicular to the spindle of the spindle head 3 and the axis of rotation R of the machining tool 2 and are also perpendicular to each other, such that two of the four driving portions 6 are disposed on opposite sides of the spindle head case 31.

The driving portions 6 are disposed adjacent to the spindle head case 31 such that at the time of extension, they apply forces to the spindle head case 31 in the positive and negative x-axis directions and the positive and negative y-axis directions. Further, each of the driving portions 6 has a strain gauge therein and is connected to the control unit 8.

Accordingly, each of the driving portions 6 is controlled by the control unit 8 on the basis of an output from the strain gauge, so as to move the spindle head 3 in the direction perpendicular to the axis of rotation R of the machining tool 2, that is, in the positive and negative x-axis directions and the positive and negative y-axis directions. It should be noted that the driving portions 6 can be operated through differential control. The differential control, as referred to herein, is a control method of controlling the driving portions 6, for example, such that when a driving portion 6 on one side extends by 10 μm, a driving portion 6 on the other side contracts by 10 μm.

The position sensor 7 is disposed in a direction perpendicular to five spindle of the spindle head 3 and the axis of rotation R of the machining tool 2, at a position adjacent to and facing the spindle head case 31. More specifically, a total of two position sensors 7 are disposed such that each of the two is disposed on one side of the spindle head 3 in each of the two directions of the x-axis and y-axis directions that are perpendicular to the spindle of the spindle head 3 and the axis of rotation R of the machining tool 2 and are also perpendicular to each other. The position sensors 7 monitor whether the driving portions 6 have actually extended or contracted as instructed by the control unit 8. The position sensors 7 may also be disposed in each of the x-axis and y-axis directions as pairs facing each other so as to detect the actual amount of movement of the spindle head case by offsetting an increase in size due to thermal expansion. Each of the position sensors 7 is connected to the control unit 8.

Examples of the position sensor 7 include a contact or non-contact displacement sensor. Examples of the non-contact displacement sensor include, but are not particularly limited to, a capacitance sensor, a laser displacement meter, an ultrasonic displacement meter, an eddy-current displacement sensor, an image sensor, and a strain gauge included in the driving portion 6. Each of the position sensors 7 measures the distances from the spindle head case 31 of the spindle head 3 in the x-axis and y-axis directions, and based on the measured distances, measures the position of the spindle head 3 on the x-y plane perpendicular to the axis of rotation R of the machining tool 2 and outputs the measured position of the spindle head 3 to the control unit 8.

The control unit 8 can include, for example, a computing unit such as a CPU, a storage unit such as a memory and a hard disk, a program stored in the storage unit, and an input/output unit for receiving/outputting signals from/to an external device such as a sensor. The control unit 8 may further include a personal computer that has an input interface such as a keyboard and a display device such as a monitor.

As shown in FIG. 2, the control unit 8 is connected to, for example, the motor 32 and outputs a control signal to the motor 32. Further, the control unit 8 is connected to the encoder 33 that measures the angle of rotation of the motor 32, and receives the angle of rotation of the drive shaft of the motor 32 from the encoder 33. Furthermore, the control unit 8 is connected to the position sensor 7 and receives the position of the spindle head 3 on the x-y plane measured by the position sensor 7. Moreover, the control unit 8 is connected to and outputs control signals to the driving portions 6.

Figure 3:
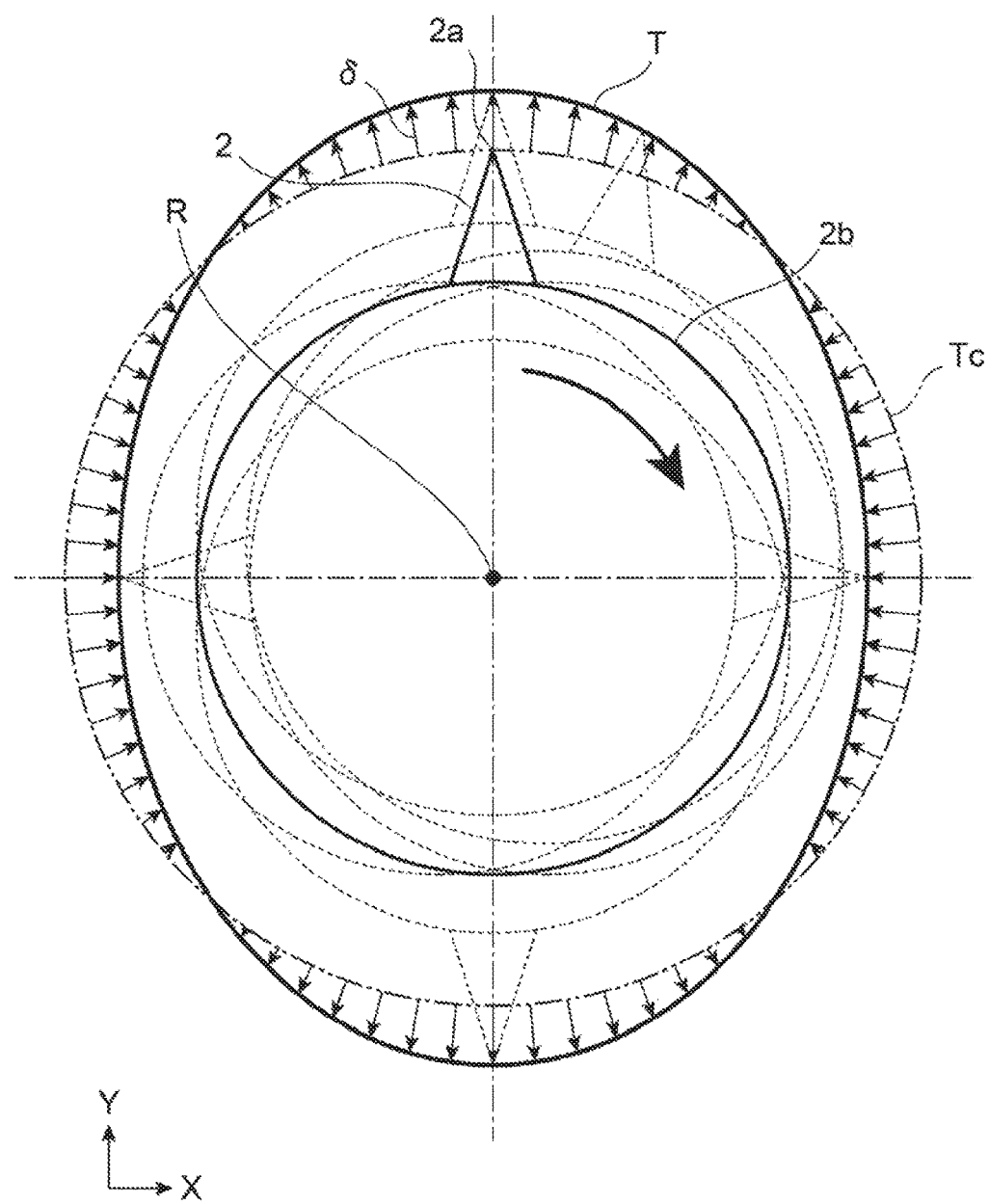
FIG. 3 is a plan view showing an example of a trajectory of tool rotation of the machining apparatus shown in FIG. 1.

FIG. 3 is a plan view showing an example of a trajectory T of tool rotation of the machining apparatus 1 shown in FIG. 1.

In the example shown in the drawing, the machining tool 2 indicated by the solid line is, for example, a cutting tool for boring. When the machining tool 2 is rotated about the axis of rotation R with the position of the spindle head 3 on the x-y plane fixed without driving the driving portions 6, a cutting edge 2a that is a machining portion of the machining tool 2 moves along a complete round trajectory Tc of tool rotation indicated by the two-dot chain line. To move the complete round trajectory Tc of tool rotation along an oval, out-of-round trajectory T of tool rotation indicated by the solid line, it is necessary to move the position of the axis of rotation R of the machining tool 2 on the x-y plane in accordance with the angle of rotation of the machining tool 2.

To this end, for example, the storage unit of the control unit 8 stores in advance the relation between the position of the spindle head 3 and the position of the axis of rotation R of the machining tool 2, the relation between the angle of rotation and position of the axis of rotation R of the machining tool 2, and the position of the cutting edge 2a, and the out-of-round trajectory T of tool rotation as a target value of the position of the cutting edge. The control unit 8, for example, computes, on the basis of a program stored in the storage unit, the relation between the angle of rotation of the machining tool 2 and the position of the spindle head 3 to move the cutting edge 2a of the machining tool 2 along the out-of-round trajectory T of tool rotation stored in the storage unit.

Further, in accordance with the angle of rotation of the machining tool 2 input from the encoder 33, the control unit S computes the amounts of extension and contraction of the driving portions 6, so as to satisfy the computed relation between the angle of rotation of the machining tool 2 and the position of the spindle head 3 on the basis of a program stored in the storage unit, tor example. Then, the control unit 8 outputs control signals in accordance with the computed amounts of expansion and contraction to the driving portions 6.

In this manner, the control unit 8 moves, as necessary, the spindle head 3 in a direction perpendicular to the axis of rotation R of the machining tool 2, and controls the driving portions 6 so as to move the machining tool 2 along the trajectory T of tool rotation preset and stored in advance in the storage unit. It should be noted that the control unit 8 can include a differential circuit that drives the opposite driving portions 6 considering the difference in the driving force between the extension and contracting operations of the driving portions 6, and hysteresis.

In this manner, in machining a workpiece W through rotation of the machining tool 2, the control unit 8 controls the driving portions 6, so as to apply an external force to the spindle head 3, thereby deviating the trajectory Tc of tool rotation from the complete round trajectory to create the out-of-round trajectory T of tool rotation and machining an out-of-round bore in the workpiece W. That is, the control unit 8 moves the spindle head 3 by driving the driving portions 6 so as to satisfy an amount δ of deviation that is the difference between the complete round trajectory Tc of tool rotation obtained when the machining tool 2 is rotated with the spindle head 3 fixed and the targeted out-of-round trajectory T of tool rotation.

Further, the control unit 8 controls the driving portions 6 on the basis of the position of the spindle head 3 input from the position sensor 7, so as to move the machining tool 2 along the trajectory T of tool rotation preset and stored in advance in the storage unit. That is, the control unit 8 performs feedback control using the computed difference between the target position of the spindle head 3 and the actual position of the spindle head 3 input from the position sensor 7, on the basis of a program stored in the storage unit, for example.

Figure 4:
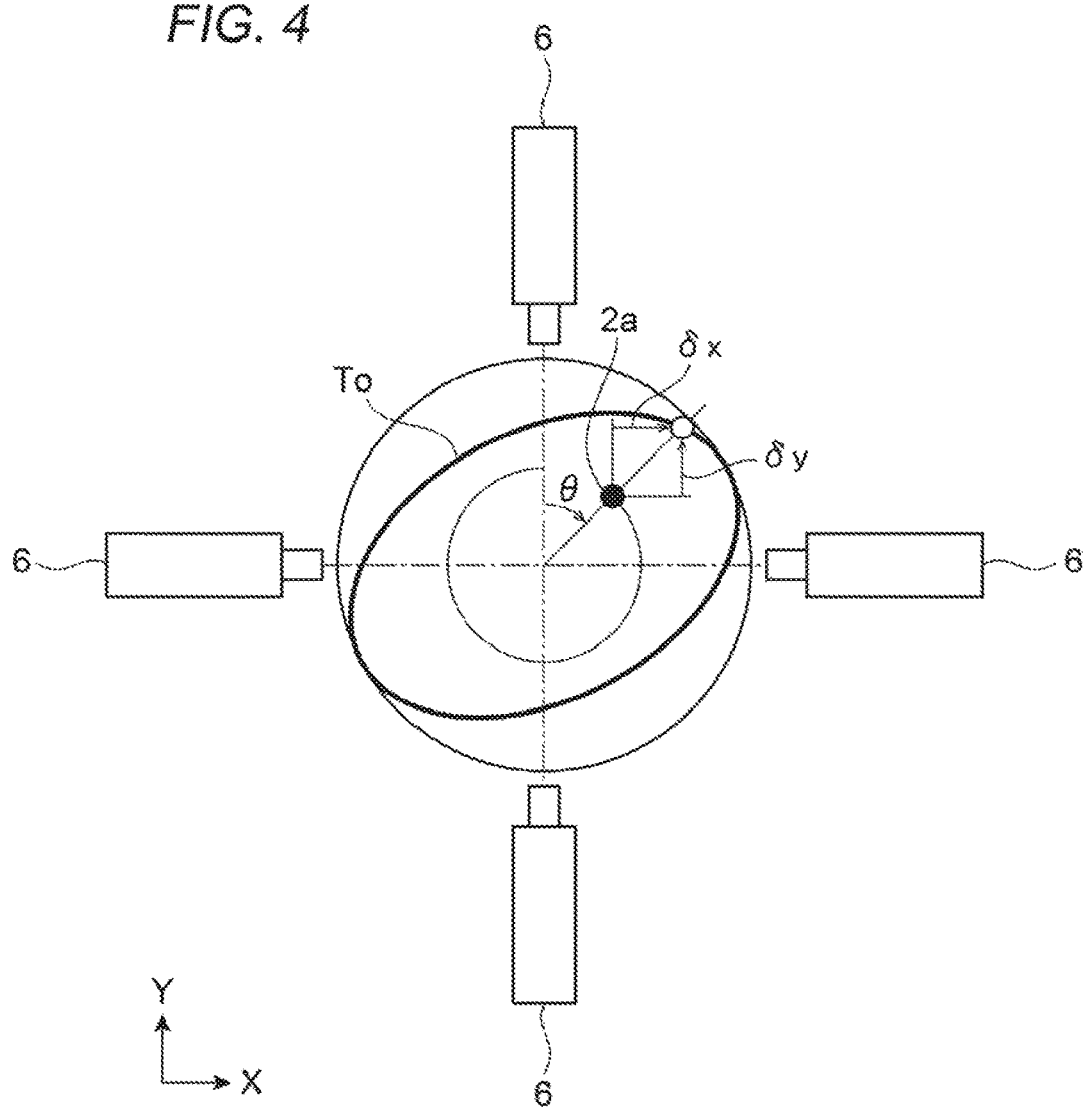
FIG. 4 is a plan view showing the relation between an oval trajectory of tool rotation and displacement amounts of a machining tool.
Figure 5:
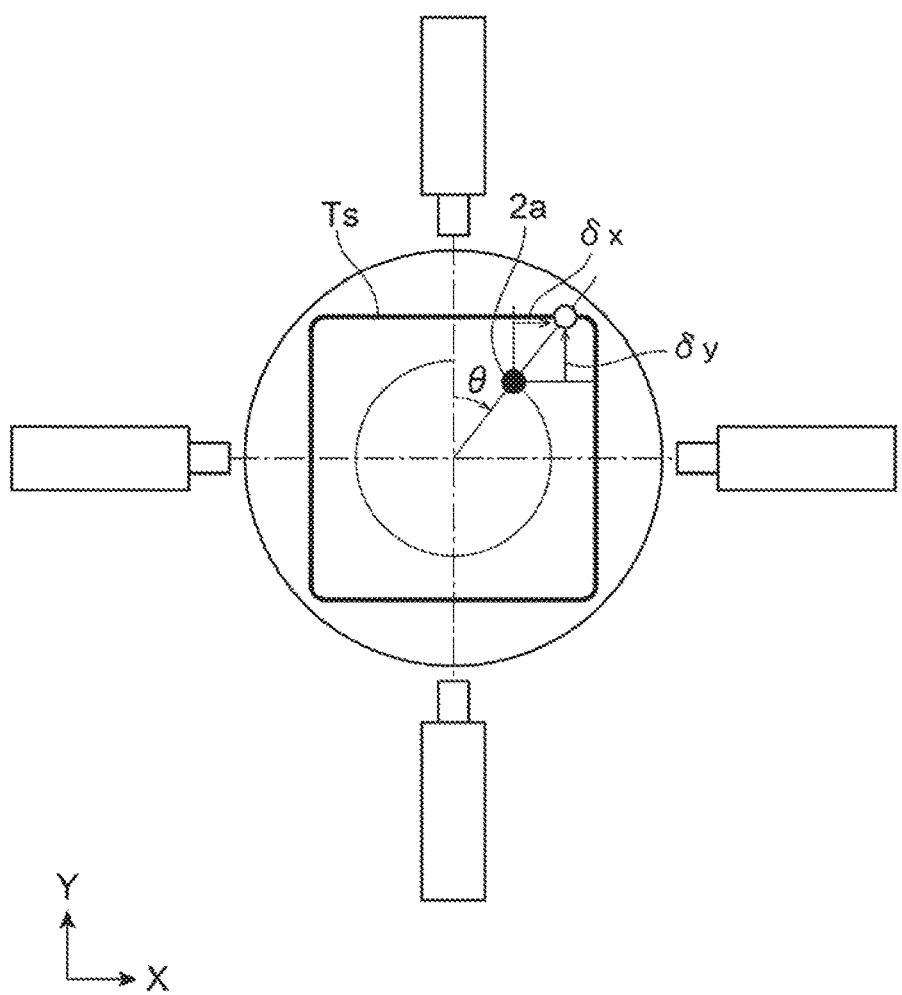
FIG. 5 is a plan view showing the relation between a square trajectory of tool rotation and displacement amounts of the machining tool.
Figure 6:
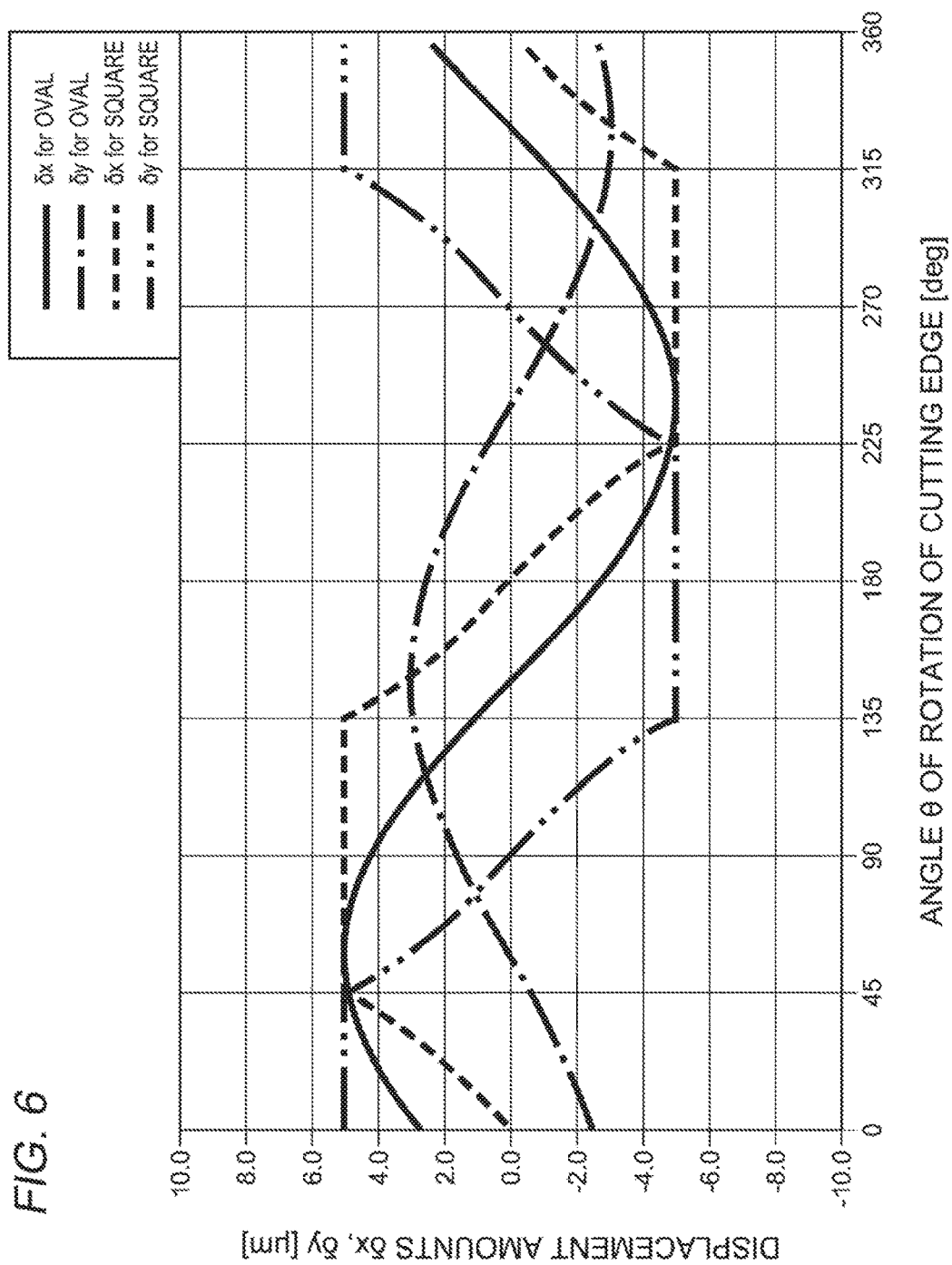
FIG. 6 is a graph showing the relation between the displacement amounts of the machining tool and the angle of rotation of a cutting edge shown in FIG. 4 and FIG. 5.

With reference to FIG. 4 to FIG. 6, the relation between an out-of-round trajectory of tool rotation and the angle of rotation and displacement amounts on the x-y plane of the machining tool 2 will be described in more detail.

FIG. 4 is a plan view showing the relation between an oval trajectory To of tool rotation and displacement amounts δx and δy of the machining tool 2, FIG. 5 is a plan view showing the relation between a square trajectory Ts of tool rotation and the displacement amounts δx and δy of the machining tool 2. FIG. 6 is a graph showing the relation between the angle θ of rotation of the cutting edge and displacement amounts δx and δy of the machining tool 2 for each of the trajectories To and Ts of tool rotation shown in FIG. 4 and FIG. 5, respectively.

It should be noted that in FIG. 6, the solid line indicates the angle θ of rotation of the cutting edge and the displacement amount δx in the x-axis direction of the machining tool 2 and the chain line indicates the angle θ of rotation of the cutting edge and the displacement amount δy in the y-axis direction of the machining tool 2, for the oval trajectory To of tool rotation shown in FIG. 4. In addition, in FIG. 6, the dashed line indicates the angle θ of rotation of the cutting edge and the displacement amount δ in the x-axis direction of the machining tool 2 and the two-dot chain line indicates the angle θ of rotation of the cutting edge and the displacement amount δy in the y-axis direction of the machining tool for the square trajectory Ts of tool rotation shown in FIG. 5.

To move the cutting edge 2a of the machining tool 2 along the oval trajectory To of tool rotation shown in FIG. 4, the control unit 8 controls pairs of driving portions 6 facing each other in the x-axis and y-axis directions to allow them to extend or contract. Further, as indicated by the solid line and the chain line of FIG. 6, the displacement amounts δx and δy of the machining tool 2 in the x-axis and y-axis directions, respectively, are changed in accordance with the angle θ of rotation of the cutting edge of the machining tool 2. In this manner, the cutting edge 2a of the machining tool 2 can be moved along the oval trajectory To of tool rotation shown in FIG. 4.

Similarly, to move the cutting edge 2a of the machining tool 2 along the square trajectory Ts of tool rotation shown in FIG. 5, the control unit 8 controls pairs of driving portions 6 facing each other in the x-axis and y-axis directions to allow them to extend or contract. Further, as indicated by the dashed line and the two-dot chain line of FIG. 6, the displacement amounts δx and δy of the machining tool 2 in the x-axis and y-axis directions, respectively, are changed in accordance with the angle θ of rotation of the cutting edge of the machining tool 2. In this manner, the cutting edge 2a of the machining tool 2 can be moved along the square trajectory Ts of tool rotation shown in FIG. 5.

As stated above, the machining apparatus 1 of the present embodiment includes the machining tool 2 and the spindle head 3 that rotates the machining tool 2, and moves the machining tool 2 along the out-of-round trajectories T, To, and Ts of tool rotation. To this end, the machining apparatus 1 includes the driving portion 6 that moves the spindle head 3 in a direction perpendicular to the axis of rotation R of the machining tool 2, the position sensor 7 that measures the position of the spindle head 3 on the x-y plane perpendicular to the axis of rotation R of the machining tool 2, and the control unit 8 that controls the driving portion 6 so as to move the machining tool 2 along the trajectories T, To, and Ts of tool rotation on the basis of the position of the spindle head 3.

Accordingly, according to the machining apparatus 1 of the present embodiment, a driving force transmission mechanism, as has been conventionally used, is no longer needed to move the machining tool 2 in a direction perpendicular to the axis of rotation R, so that the structure can be simplified. Further, according to the machining apparatus 1 of the present embodiment, since abrasion of sliding portions of a force transmission mechanism does not occur unlike in the conventional apparatuses, the positioning accuracy of the machining tool 2 can be improved as compared to those of the conventional apparatuses. Furthermore, through adoption of piezo actuators or magnetostrictive members for the driving portions 6, the driving portions 6 can be downsized while generating enough power, thereby realizing a fast response.

Moreover, according to the machining apparatus 1 of the present embodiment, the position of the spindle head 3 can be directly measured by the position sensor 7, and feedback control of the driving portions 6 can be performed using the difference between a target position of the spindle head 3 and the actual position of the spindle head 3 input from the position sensor 7. In this manner, the displacement amounts $\delta x$ and $\delta y$ of the cutting edge 2a of the machining tool 2 can be more accurately controlled.

Further, according to the machining apparatus 1 of the present embodiment, a portion for holding the tool of the spindle head 3 can be those of a general-purpose type, and a general-purpose tool can be used as the machining tool 2. Also, adopting a general-purpose spindle structure enables automatic tool exchange so as to allow rough and finish boring to be performed in a single process, and further enables tools to be exchanged among a milling machine, a drill, a tap, and the like.

Furthermore, according to the machining apparatus 1 of the present embodiment, with the use of the driving portions 6, each of the trajectories T, To, and Ts of tool rotation of the machining tool 2 can be obtained by displacing the trajectory from the complete round trajectory Tc of tool rotation radially either outward (in the positive direction) or inward (in the negative direction) with respect to the axis of rotation R as the center. In other words, it is also possible to machine a bore with a smaller diameter than that of the cutting edge 2a of the tool and withdraw the cutting edge 2a without leaving a return mark on the workpiece W after machining. Further, with the use of the driving portions 6 capable of responding fast, the trajectories T, To, and Ts of tool rotation can also be made to have a square or a potbelly shape.

Moreover, although not shown, in the machining apparatus 1 of the present embodiment, the control unit 8 may be connected to a feeding device that moves the workpiece W in the direction of the axis of rotation R of the machining tool 2. In that case, the control unit 8 controls the feeding device by outputting a control signal thereto so as to feed the workpiece W in the direction of the axis of rotation R in synchronization with the rotation of the machining tool 2, whereby a three-dimensional complete round or out-of-round bore can be formed in the workpiece W.

An example of machining of a cylinder block with the use of the machining apparatus 1 of the present embodiment will be described below.

FIG. 7A and FIG. 7B are conceptual views of a bore Bc machined so as to have a complete round shape and a bore Bn machined so as to have an out-of-round shape, respectively. FIG. 7A is a conceptual view of the bore Bc of the cylinder block machined so as to have a three-dimensional complete round shape FIG. 7B is a conceptual view of the bore Bn of the cylinder block machined by the machining apparatus 1 of the present embodiment so as to have a three-dimensional out-of-round shape.

As shown in FIG. 7A, when the bore Bc of the cylinder block is machined so as to have a three-dimensional complete round shape and a cylinder head or the like is then assembled thereto, the complete round cylindrical shape is deformed to an out-of-round cylindrical shape due to the stress applied upon assembly or the like. Further, during engine operation, the out-of-round cylindrical shape of the bore Bc is further deformed due to the thermal stress from combustion heat inside the cylinder or the like.

In contrast, to allow the shape of the bore Bn of the cylinder block to become as close to a complete round cylindrical shape as possible during engine operation, the bore Bn of the cylinder block can be machined by the machining apparatus 1 so as to have the out-of-round cylindrical shape shown in FIG. 7B. The out-of-round cylindrical bore Bn can be formed, for example, in an inverted shape of the shape obtained through deformation of the bore Bc of the cylinder block that has been machined so as to have a cylindrical complete round shape, due to the stress applied upon assembly and the thermal stress applied during the operation.

Thus, as shown in FIG. 7B, the shape of the bore Bn can be made closer to a complete round cylindrical shape with the use of the stress applied to the bore Bn upon assembly of a cylinder head thereto and the thermal stress applied to the bore Bn during engine operation. This reduces frictional resistance of a piston, and thus improved fuel efficiency can be expected.

Figure 8:
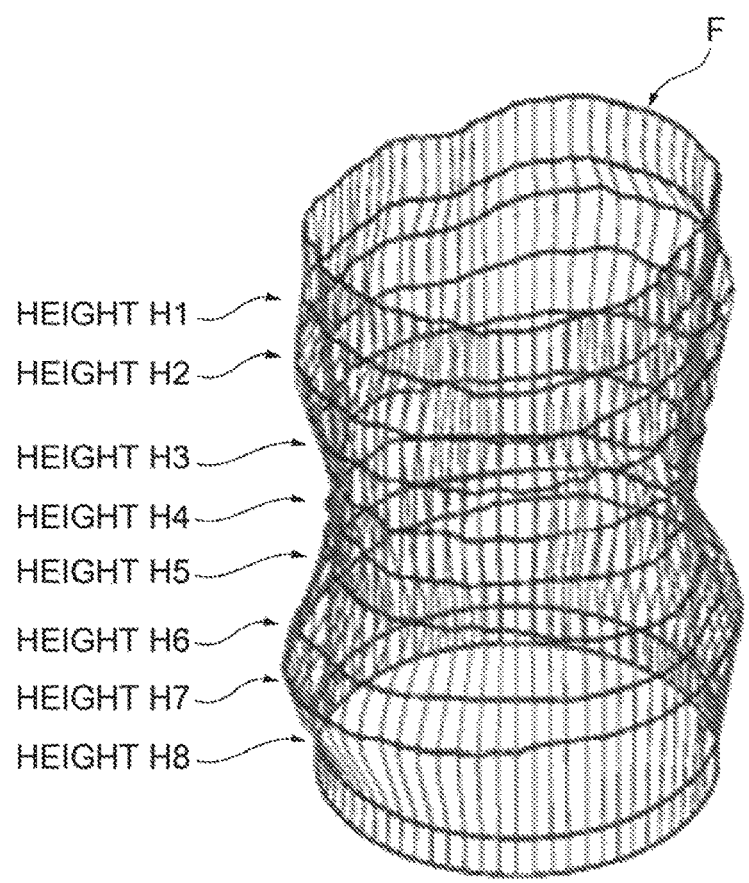
FIG. 8 is a model showing an example of a targeted out-of-round shape.

FIG. 8 is a model showing an example of an out-of-round shape F that is targeted in performing machining with the use of the machining apparatus 1 of the present embodiment. More specifically, the out-of-round shape F is an out-of-round cylindrical shape obtained through inversion of the shape of the cylinder block during engine operation. It should be noted that the shape that is targeted in performing machining with the use of the machining apparatus 1 is not limited to the out-of-round shape F, but may be a complete round shape, that is, a complete round cylindrical shape.

In the example shown in the drawing, the targeted out-of-round shape F has, in its height direction, a shape close to a complete round in the lower portion, a shape close to a square in the middle portion for offsetting the influence of fastening of a head bolt, and a shape close to an oval inclined in one direction in the upper portion. These shapes need to change smoothly and gradually. That is, the shape of the targeted out-of-round shape F needs to change gradually and smoothly in a continuous manner from the upper end to the lower end.

Figure 9:
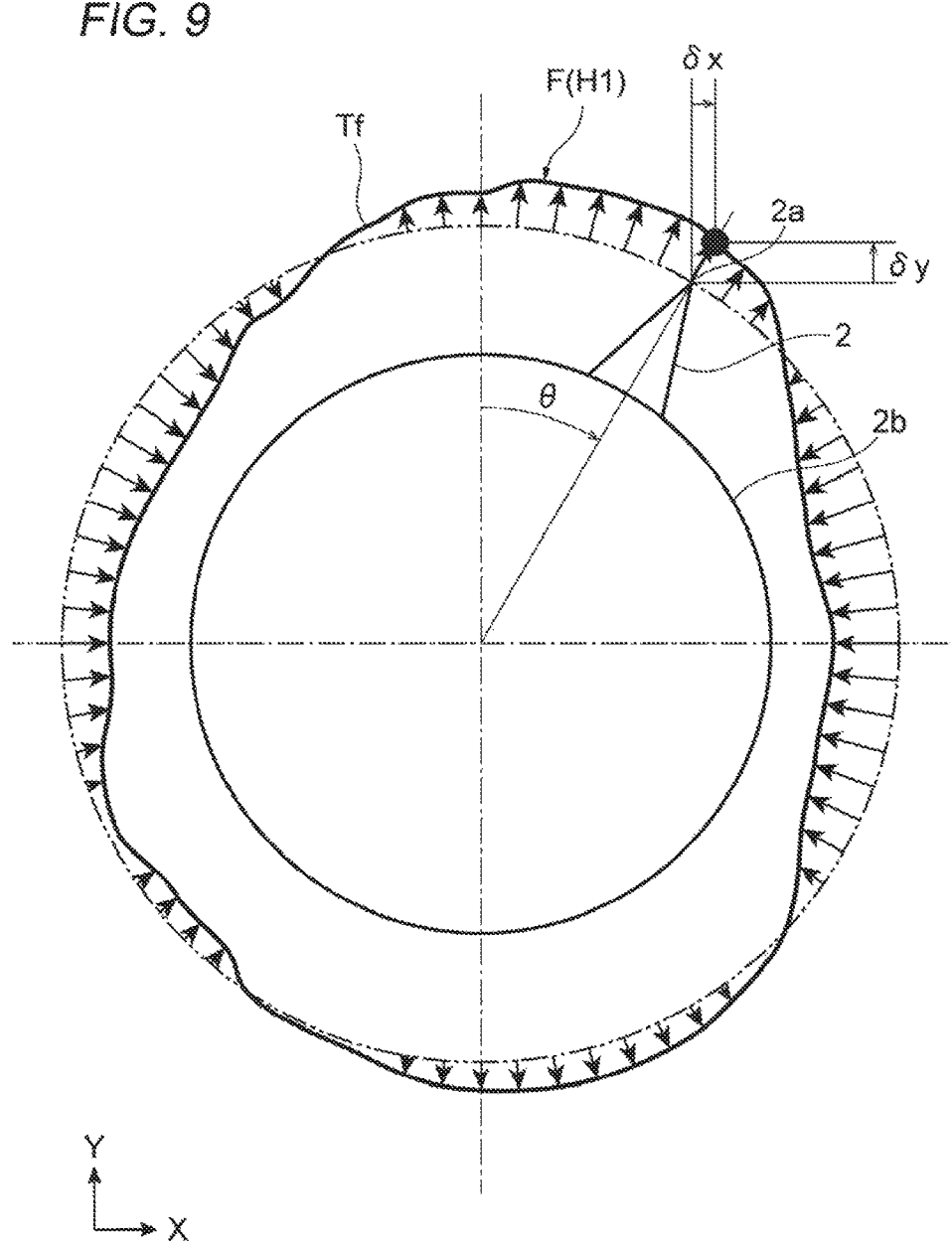
FIG. 9 is a flat cross-sectional view at a height H1 of the out-of-round shape shown in FIG. 8.
Figure 10:
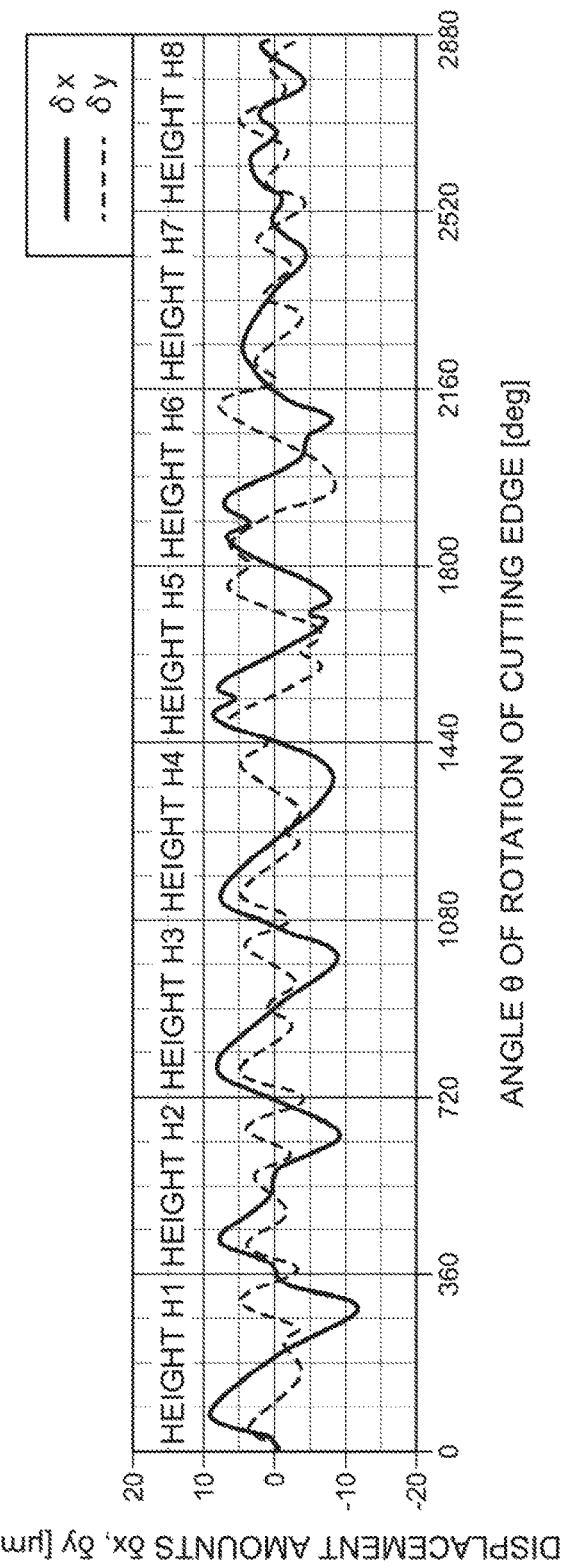
FIG. 10 is a graph showing the relation between displacement amounts of the machining tool and the angle of rotation of the cutting edge at each height shown in FIG. 8.

FIG. 9 is a flat cross-sectional view at a height H1 of the out-of-round shape shown in FIG. 8. FIG. 10 is a graph showing the relation between the displacement amounts $\delta x$ and $\delta y$ of the machining tool 2 and the angle $\theta$ of rotation of the cutting edge at each height of H1 to H8 of the out-of-round shape shown in FIG. 8.

As shown in FIG. 9, at the height H1, the cutting edge 2a of the machining tool 2 needs to be moved along an out-of-round trajectory Tf of tool rotation with a shape close to an inclined oval. So this end, in the machining apparatus 1 of the present embodiment, the control unit 8 controls the motor 32 and the driving portions 6 so as to change the displacement amounts $\delta x$ and $\delta y$ of the machining tool 2 in the x-axis and y-axis directions, respectively, in accordance with the angle θ of rotation of the cutting edge of the machining tool 2, as shown in FIG. 10. In this case, in the machining apparatus 1, the control unit 8 controls the feeding device and the feeding device feeds the work piece W in the direction of the axis of rotation R of the machining tool 2, thereby performing machining so as to draw a continuous spiral.

Similarly, in the machining apparatus 1 also at the other heights of H2 to H8 of the out-of-round shape F shown in FIG. 8, the displacement amounts δx and δy of the machining tool 2 in the x-axis and y-axis directions, respectively, are changed in accordance with the angle θ of rotation of the cutting edge of the machining tool 2, as shown in FIG. 10. In this manner, the machining apparatus 1 can machine the out-of-round cylindrical shape F shown in FIG. 8.

It should be noted that the actual shape changes gradually and smoothly in a continuous manner from the height H1 to height H8. Therefore, using the out-of-round trajectory Tf of tool rotation obtained through slicing of the targeted out-of-round shape F at the feed pitch of the workpiece W, the bore of the cylinder block can be machined so as to have a targeted three-dimensional out-of-round shape F.

FIG. 11 is a flow chart showing an example of out-of-round machining performed with the use of the machining apparatus 1 of the present embodiment. More specifically, FIG. 11 shows a flow of machining a bore of a cylinder block so as to have the out-of-round cylindrical shape shown in FIG. 8 with the use of the machining apparatus 1 of the present embodiment.

First, in step S1, an engine is assembled using a cylinder block having a complete round cylindrical bore machined therein at room temperature. Next, in step S2, the assembled engine is operated on a test bench. Then, in step S3, the inner diameter shape of the bore during engine operation is measured. Next, in step S4, through data interpolation of the inner diameter shape of the bore measured in the previous step S3, shape data is created so as to create a 3D model thereof.

Then, in step S5, the shape data created in the previous step S4 is inverted to create an inverted shape data so as to create an inverted 3D model thereof. Next, in step S6, position data of the machining tool 2 in accordance with the path of the cutting edge 2a of the machining tool 2 is extracted as point data of the shape to be fed per rotation of the cutting edge 2a. Then, in step S7, the inverted shape data and the position data created in the previous steps S5 and S6, respectively, are input to the control unit 8 of the machining apparatus 1, so that out-of-round machining is performed.

Next, in step S8, the inner diameter shape of the bore of the cylinder block machined by the machining apparatus 1 is measured. Then, in step S9, through data interpolation of the inner diameter shape of the bore measured in the previous step S8, shape data is created so as to create a 3D model thereof. Next, in step S10, the 3D model of the actual bore created in the previous step S9 and the inverted 3D model to be processed as a target value are compared, and if these shapes do not match, the process proceeds to step S11. In step S11, components data is corrected and the process returns to step S7.

Meanwhile, in step S10, if the 3D model of the actual bore and the inverted 3D model match, the process proceeds to step S12. In step S12, after the inner surface of the bore of the cylinder block is treated for lowering friction, the engine is assembled. Then, in step S13, the engine assembled in the previous step S12 is operated on a test bench. Next, in step S14, the inner diameter shape of the bore of the cylinder block during the actual engine operation is measured.

Next, in step S15, whether or not the inner diameter shape of the bore of the cylinder block measured in the previous step S14 is a complete round cylindrical shape is determined. As a result of determination, if the shape is not determined to be a complete round cylindrical shape, the process proceeds to step S16 to correct components data, and the process returns to step S5. Meanwhile, as a result of determination in step S15, if the shape is determined to be a complete round cylindrical shape, the process proceeds to step S17. In step S17, machining data that allows a complete round cylindrical shape to be formed during engine operation is established and using the machining data, cylinder blocks with out-of-round cylindrical bores are mass-produced through machining.

As stated above, data on complete round or out-of-round shapes in accordance with row materials and vehicle models is stored so that cylinder blocks whose bores form complete round cylindrical shapes during engine operation can be easily mass-produced through machining, following a production plan.

Although the embodiment of the present disclosure has been described in detail with reference to the drawings, specific structures are not limited thereto, and any design changes that may occur within the spirit and scope of the present disclosure are all included in the present disclosure.

For example, the number of the driving portions is not limited to four. For example, a driving portion may be disposed on one side of the spindle head in each of the x-axis and y-axis directions and a spring may be disposed on the other side so as to move the spindle head through extension of the driving portion and contraction of the spring. Further, for downsizing the spindle head, each of the drive portions may be folded at 90°. Furthermore, a workpiece may be rotated instead of rotating the machining tool. Also, the out-of-round machining can be performed on not only the inner surface of a bore, but also the outer periphery surface of a workpiece.

DESCRIPTION OF SYMBOLS

1 Machining apparatus
2b Rotating tool
2 Machining tool
3 Spindle head
6 Driving portion
7 Position sensor
8 Control unit
R Axis of rotation
T Trajectory of tool rotation
Tf Trajectory of tool rotation
To Trajectory of tool rotation
Ts Trajectory of tool rotation

What is claimed is:

1. A machining apparatus including a rotating tool, a machining tool provided on an outer periphery of the rotating tool, and a spindle head adapted to rotatably support the rotating tool, comprising:

a driving portion configured to extend and apply a force to a case of the spindle head to move the spindle head in a direction perpendicular to an axis of rotation of the rotating tool;

a position sensor configured to measure a position of the spindle head on a plane perpendicular to the axis of rotation; and a control unit configured to control the driving portion so as to move the machining tool in a direction perpendicular to the axis of rotation on the basis of the position of the spindle head.

2. The machining apparatus according to claim 1, wherein the driving portion includes a plurality of driving portions that are disposed so as to face the spindle head in two or more directions perpendicular to the axis of rotation.

3. The machining apparatus according to claim 1, wherein the driving portion includes a piezo actuator or a magnetostrictive member.

4. The machining apparatus according to claim 1, wherein the control unit is configured to control the driving portion on the basis of a target position of the spindle head at an angle of rotation of the machining tool.

5. The machining apparatus according to claim 1, wherein the control unit is configured to perform feedback control using a difference between a target position and an actual position of the spindle head.

6. The machining apparatus according to claim 1, wherein the spindle head includes a spindle adapted to rotate the rotating tool, a bearing adapted to rotatably support the spindle, a motor adapted to rotate the spindle, and an encoder configured to measure an angle of rotation of the motor.

7. The machining apparatus according to claim 1, wherein the driving portion includes a first pair of driving portions that face the spindle head in a first direction perpendicular to the axis of rotation and a second pair of driving portions that face the spindle head in a second direction perpendicular to the axis of rotation and perpendicular to the first direction.

8. The machining apparatus according to claim 7, wherein the first pair of driving portions are arranged on opposite sides of the spindle head and are operated by a differential control where an extension of one of the first pair of driving portions is equal to contraction of the other of the first pair of driving portions.

9. The machining apparatus according to claim 1, wherein the driving portion includes a magnetostrictive member.

* * * * *